United States Patent [19]
Wyber

[11] Patent Number: 4,486,862
[45] Date of Patent: Dec. 4, 1984

[54] DETERMINATION OF SYSTEM RESPONSE

[75] Inventor: Ronald J. Wyber, Sydney, Australia

[73] Assignee: The Commonwealth of Australia, Canberra, Australia

[21] Appl. No.: 409,670

[22] Filed: Aug. 19, 1982

[30] Foreign Application Priority Data

Aug. 24, 1981 [AU] Australia ............... PF0404

[51] Int. Cl.³ ............................ G01C 17/38
[52] U.S. Cl. .................... 367/13; 73/1 DV
[58] Field of Search ............ 367/13; 73/1 DV; 179/175.1 A

[56] References Cited

U.S. PATENT DOCUMENTS

3,912,880 10/1975 Powter ............ 179/175.1 A
3,942,150 3/1976 Booth et al. ............ 367/13

Primary Examiner—Richard A. Farley
Attorney, Agent, or Firm—Parmelee, Miller, Welsh & Kratz

[57] ABSTRACT

Determination of the impulse response of a system such as a hydrophone is determined by generating a broad band reproducible test signal which after propagation is received and a replica of the broad band test signal is produced; either the received signal is compensated for fluctuations in propagation time of the test signal through the system and cross correlation of the compensated signal with the non-compensated signal is effected to derive the system response. A secondary signal may be used with the broad band test signal whereby the Doppler shift of the secondary signal can be utilized to determine the required compensation. Feed-back shift registers are disclosed for generating pseudo random noise for the test signal and the replica thereof. The invention permits calibration of a hydrophone in circumstances in which noise is present and variation in path length of the propagated test signal occurs.

23 Claims, 5 Drawing Figures

DETERMINATION OF SYSTEM RESPONSE

The present invention relates to a method of and apparatus for signal processing and more particularly is concerned with the determination of the system response which in the frequency domain is known as the transfer function and in the time domain is known as the impulse response.

The invention is particularly directed to system response determination where the propagation time of a test signal through the system is subject to fluctation and in addition noise is present.

An example of the use of the invention is the calibration of hydrophones, although other applications of the invention exist. For convenience, the invention will be exemplified with reference to the problem of calibrating hydrophones. In the past it has been quite difficult if not impossible to calibrate accurately hydrophones in a cost efficient manner. In particular, existing test procedures require the use of an expensive under water acoustic range which, by its nature, must be large and require a vessel carrying the hydrophone to voyage to the range.

The testing of a hydrophone requires the measurement of its phase and amplitude response. Thus, it is necessary to transmit a known test signal through the water medium to the hydrophone to be tested, and to process the signal generated by the hydrophone to determine the impulse response of the transducer. Major difficulties experienced in the testing of such transducers are as follows:

(a) Secondary signals caused by reflections of the transmitted signal from the surface of the water and other objects within the water have the effect of confusing the true response signal.
(b) Background noise may be at such a level that it is impossible to separate the desired signal from the noise signal at the output of the hydrophone.
(c) The effective path length between the transducer generating the test signal and the transducer being tested may vary, substantially upsetting phase measurements.

Present hydrophone testing techniques are suitable in some cases provided there is little or no variation in the effective signal path length and noise conditions are appropriate. These techniques may be used with a reasonable 2degree of success in a standard acoustic range environment. However, these methods are quite unsuitable where the signal path length is subject to variation. Indeed, even where the distance between the transmitting and test transducers is fixed, fluctuations in propagation speed in the water medium may cause propagation time fluctuations and therefore result in a blurring of test results.

Since the propagation path is generally of a length much greater than the wave length of the signals involved, changes in the effective path length generally do not affect the measurements of the amplitude response. However, small changes in propagation time due to changes in effective path length will usually invalidate phase measurements.

Known systems for investigating system response include the transmission of either a tone burst (a signal comprising a single frequency and which is of finite duration) or a broad band signal. Techniques using a tone burst provide a good result as far as they go in that it is possible to achieve a relatively high signal energy at the frequency of interest and accordingly a good signal to noise ratio is generally available. Apart from the major disadvantage of the time required to measure the system response over a full frequency spectrum using this method with a large number of different tones, a disadvantage of this method is that separate frequency measurements over the frequency band of interest are not made simultaneously and as a result, meaningful phase measurements are difficult to obtain.

The alternative method involves the use of a broad band signal source, that is a source which provides a signal the energy of which is distributed over a wide frequency band. In the usual case, where known transducers are used, this method has the disadvantage of providing measurements having a very poor signal to noise ratio in view of the broad, relatively low, average energy distribution of the signal used. To provide higher energy signals an impulsive source such as a spark discharge or an explosion may be used. However, in many situations it is considered too dangerous or inappropriate to use such sources. Also, because of the unpredictable level of output from such an impulsive source, a calibrated hydrophone must be used to determine the level and character of the test signal in order that the signal produced by the test hydrophone may be studied to determine the hydrophone response. The calibration hydrophone must be placed near the hydrophone under test and carefully aligned to avoid errors arising from non-linear effects which may distort the frequency spectrum.

Cross correlating of respective input and output signals of a system to derive the system impulse response is a known practice. A significant advantage of using the cross correlation technique is that the signal to noise ratio of the resultant impulse response signal is far better than the respective signal to noise ratios of the signals before cross correlation. Known apparatus exists for performing cross correlation of two signals. Due to practical size limits on such an apparatus, cross correlation is usually restricted to say 1,000 discrete sampling points on each of the signals to be cross correlated. Thus a "window" is set for sampling a particular portion of each of the signals to be cross correlated. The cross correlation process comprises sampling the value of the signal at each of the sampling points in time and at each sampling point multiplying the value of the signal in the first and the second signals and finally adding all the values so derived at all the sampling points to produce the first point of the cross correlation function. The signals are then displaced in time by one sampling point relative to one another and the process repeated to produce the second point of the cross correlation and function and so on. It can be demonstrated mathematically that when white noise is applied to a system and the output of the system is cross correlated with the white noise input, then the cross correlation function is the impulse response, assuming the system to be a linear system.

However, up till now it has been virtually impossible to use effectively this technique in relation to hydrophone testing systems, and similar systems which when under test are subjected to fluctuations in propagation time of signals as they pass through these systems.

According to one aspect of the present invention, there is provided a method of determining the system response for a system where there is noise present and the propagation time of a signal used to test the system response is subject to variation, the method comprising the steps of:

(a) generating a broad band reproducible test signal and applying it to the system for propagation therethrough;
(b) detecting the signal after it has been passed by the system;
(c) producing a replica of the test signal;
(d) applying compensation to either the detected signal or the replica signal to compensate for fluctuations in propagation time of the test signal through the system; and
(e) cross correlating the compensated signal with the noncompensated one of the detected and replica signals in order to derive the system response.

The broad band test signal in this specification is also referred to as a pseudo random white noise signal and such a signal may be generated by known arrangements for example using a preprogrammed feedback shift register such as that described by D. A. Huffman in "The Synthesis of Linear Sequential Coding Network" (Proc. 3rd London Symp. on Inf. Theory).

Whilst it may be possible to implement the invention in various ways for applying compensation to one of the signals for fluctuations in propagation time, preferably a secondary test signal is also applied to the system and the influence of the system on this test signal is employed to determine the compensation required.

Preferably this secondary signal is in the form of a single tone signal and fluctuations in propagation time alter the signal in a manner which may be described as a Doppler shift which can readily be detected and the desired compensation determined. The delays in the secondary signal may be then used, in one embodiment of the invention, to modify the process of replication of the test signal to ensure the replicated said signal is virtually identical in characer to the signal originally produced but for delay or advance in time as appropriate to compensate for time variations in propagation of the originally produced pseudo random noise signal.

In the case where the test signal is pseudo random noise having a fixed length of sequence, in order to determine the start point of the sequence and to ensure synchronisation between the propagated and replicated signals, the method may include applying a synchronising pulse to the system. This pulse is processed and arranged to initialise the replicating means and to synchronise the replicated and the propagated signals. This arrangement is the preferred arrangement although if a long enough sequence for the pseudo random noise is available and it were convenient to have a sufficiently long signal sampled in the cross correlation step, it would not be essential to utilise such a synchronising pulse.

For convenience the invention will be illustrated and described further with reference to a preferred embodiment in which it is the replicated test signal which is compensated.

The appropriately compensated replicated test signal may be cross correlated with the unprocessed propagated and detected test signal (which also suffered the propagation time variances experienced by the secondary single tone signal) to provide an accurate system response.

According to another aspect of the invention there is provided an apparatus for use in testing the system response of a system in which the propagation time of a broad band test signal applied to the system for this purpose is subject to variation, the apparatus comprising means for receiving the propagated broad band test signal, means to replicate the applied broad band test signal, means for determining the required compensation for fluctuations in the propagation time of the test signal through the system, means for compensating either the received broad band test signal or the replica signal to compensate for fluctuations in propagation time of the test signal, and output means for providing signals for cross-correlation, the signals being the replicated signal and the test signal one of which is compensated. With advantage the apparatus may also include means for cross-correlating said output signals thereby providing a cross-correlation function which is capable of analysis by a Fourier transform technique.

The apparatus may be applied to a hydrophone acting as a receiving transducer whereby the performance of the transducer may be established.

The apparatus may also include means for generating said broad band test signal and preferably this is in the form of a pseudo random white noise generated by a feedback shift register, identical feedback shift registers being provided for association with both the transmitting and receiving portions of the system under test.

In a preferred embodiment, the compensation means comprises means for modifying a clock drive of a feedback shift register to be associated with the receiving portion of the system, this modification preferably being derived by the apparatus including means for transmitting a second test signal simultaneously with said broad band test signal and means for detecting in the second test signal changes in propagation time.

This arrangement may be best provided by the second signal being a single tone signal whereby the propagation time introduces a Doppler shift which can readily be detected to derive the required compensation for modifying said clock drive.

Preferably, the apparatus also includes means for generating a synchronising pulse for the feedback shift register and means in the receiving portion of the circuit for synchronising the feedback shift register of the replica feedback shift register.

Thus in a preferred embodiment of the invention, the transmitting portion of the system transmits a broad band test signal, a secondary signal which is a single frequency tone and periodically a synchronising pulse. It should be noted however that after initial synchronisation of the feedback shift registers in the receiving and transmitting portions of the system, the synchronising pulse could be turned off as it is no longer required.

The apparatus for testing the system response would preferably include a commercially available signal processor capable of effecting cross correlation of signals. Such equipment enables the storage of the cross-correlation function. The equipment also enables the selection of preprogrammed or otherwise selected gating windows for use after the correlation process. An impulse response can thus be calculated from the data and it is possible, after the event, to select what is considered to be the optimum gating window for the impulse response prior to effecting a Fourier transform to determine the frequency response. The selection of a suitable gating window allows reflections in the reflected signal to be removed in an optional manner.

Advantages of embodiments of the invention include the following:

1. Using the invention it is possible to test the impulse response of a system accurately even though the time for test signal propagation through the system varies and there is only a poor signal to noise ratio.

2. The present invention may be used even though no direct electrical connection is applied between the test signal source and the system output signal processing means.

3. The invention may have a broad range of applications and, for example, may be used to test room acoustics, audio equipment etc. (without the use of an anechoic chamber).

4. With regard to hydrophones, the invention is particularly useful for testing hydrophones mounted in boats, ships or the like, even though there is relative movement between the craft in which the hydrophones are mounted, and there is a great deal of noise in the hydrophone test area. In particular, no specialised acoustic range is required.

5. The invention has application to all control systems where the impulse response is to be determined.

6. A key advantage of the system is that known cross-correlation signal processing techniques may now be applied to a situation where up to now it has not been possible to do so. Known cross correlating machines may be used and appropriate gating windows may be applied to the impulse response prior to effecting Fourier transformation of the signal. This is particularly useful for the removal of reflections from signals in the time domain prior to effecting the Fourier transform.

A preferred embodiment of the invention will now be described; the embodiment is an apparatus for testing the response of a hydrophone which will be described with reference to the accompanying drawings in which.

Figure 1:
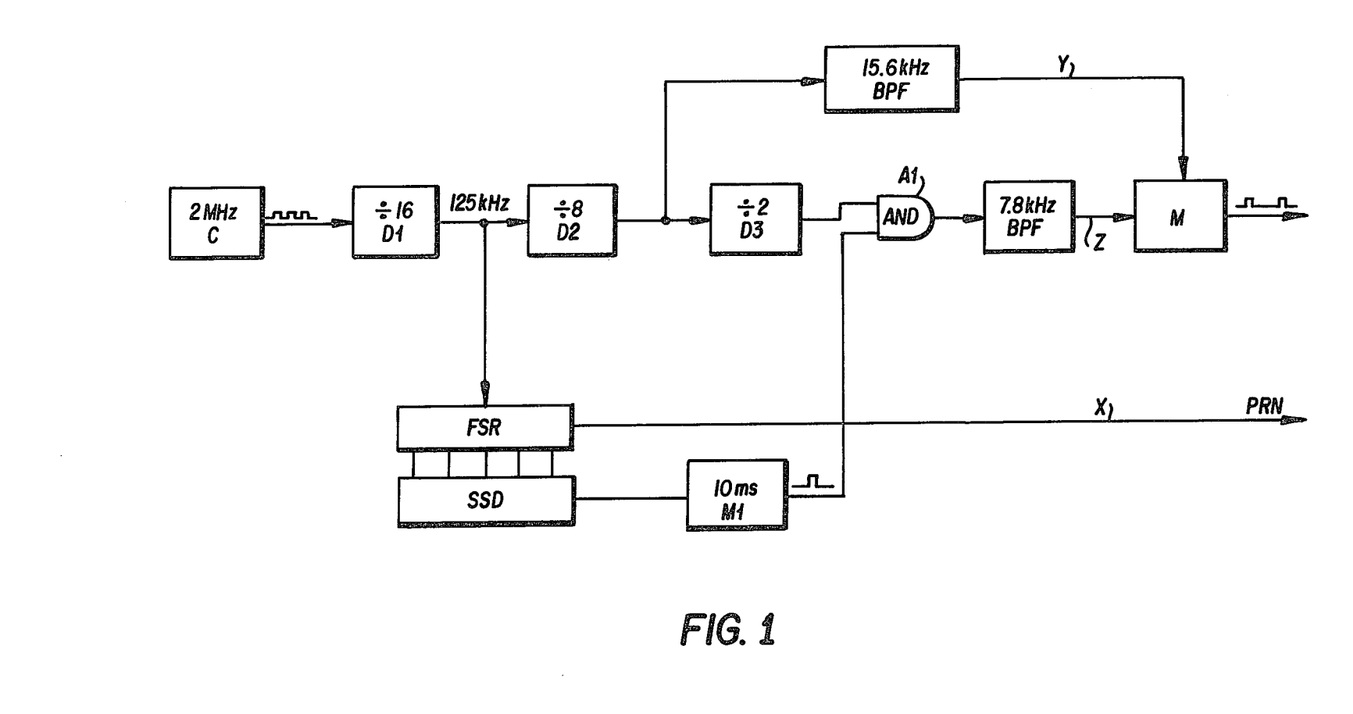
FIG. 1 is the block diagram of a signal generator and transmitter.

Turning first to FIG. 1, there is shown in schematic form an apparatus capable of generating three separate signals. These signals are a pseudo random noise signal PRN on line X, a 15.6 kHz constant tone on line Y, and a periodic 7.8 kHz synchronisation pulse on line Z. These signals are generated as follows.

The entire circuit is clocked by a 2 MHz clock C as shown at the left hand side of FIG. 1. The output of this clock is fed into a chain of dividers D1, D2 and D3 in which the signal is divided respectively by 16, by 8 and then by 2. The output of the by 16 divider D1 is a signal of 125 kHz. This signal is used to clock a feedback shift register (FSR) which is allowed to run freely under the control of the clock. The shift register is pre-programmed to produce pseudo random noise when strobed by a constant speed clock signal and, as illustrated, this noise is an output from the transmitter. A sequence start detector (SSD) is provided to determine when the feed back shift register is commencing a new sequence. At the time of each sequence commencement, a 10 millisecond gating pulse is provided by a monostable vibrator M1 and this pulse is used to strobe an "AND" gate A1, the other input to which is the output from the by 2 divider D3. Thus, a tone burst signal of boit 7.8 kHz is strobed at the start of each feedback shift register sequence and passed via a 7.8 kHz band pass filter (BPF) to a mixer (M) as shown, and then transmitted.

The output of the by 8 divider D2 is tapped off and passed through a 15.6 kHz band pass filter (BPF) before being mixed with the output of the 7.8 kHz band pass filter for transmission.

Thus, the transmitter produces a three part signal which comprises a pseudo random noise signal, a constantly running 15.6 kHz single tone signal and a periodically strobed 7.8 kHz synchronising pulse.

Figure 2:
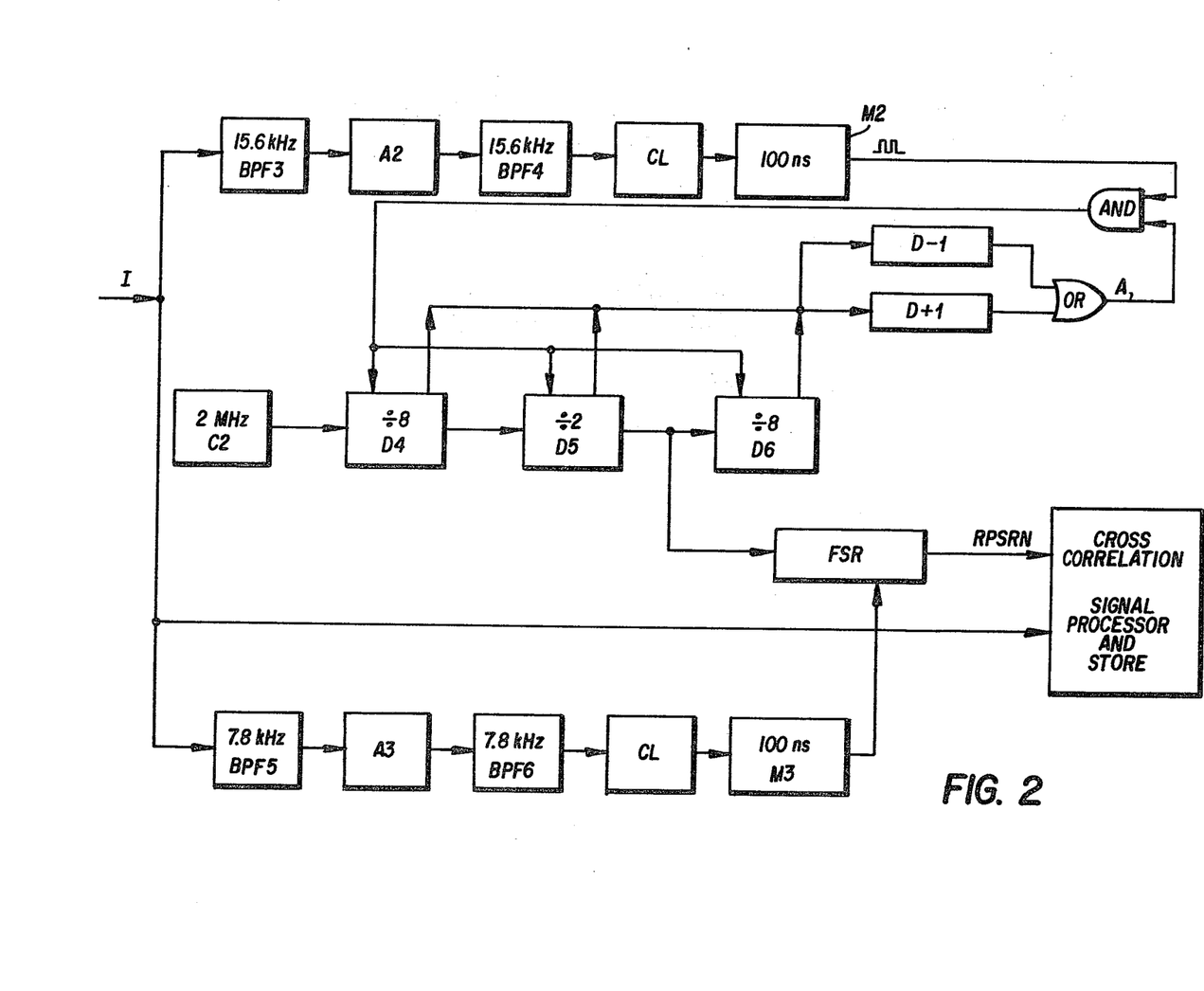
FIG. 2 is a block diagram of a receiver arranged to detect signals transmitted by the transmitter.

Turning now to FIG. 2, there is shown in block form a receiver circuit arranged to receive the output signals from the transmitter described in FIG. 1 and to produce from those signals a replicated pseudo random noise signal substantially identical with the pseudo random noise signal generated by the transmitter but modified to compensate for fluctuations in the time taken for the pseudo random noise signal to travel between the transmitter and receiver.

At the input (I), it can be seen that the signal is divided into two paths, one path comprising a circuit path arranged for the processing of the 15.6 kHz tone, the other path comprising a circuit path arranged to process the 7.8 kHz synchronising pulse. A third path may be considered to start at a 2 MHz clock (C2). As with the transmitter, the 2 MHz signal is fed into a chain of dividers D5, D6 and D7 provided with a common reset circuit R and means to detect for two distinct conditions in the counter chain as described hereinafter.

Figure 3:
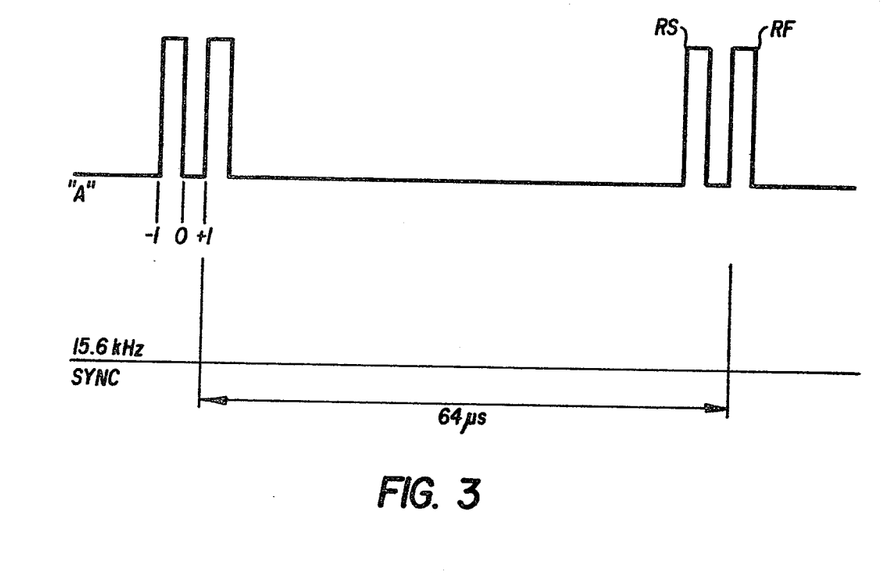
FIG. 3 illustrates the wave form of signals appearing at various points in the receiver circuit of FIG. 2.

The 15.6 kHz path comprises a band pass filter BPF3, an amplifier A2, a further 15.6 kHz band pass filter BPF4, a clipper CL to square up the signal and a monostable vibrator M2 which is fired to produce 100 nanosecond output pulses. The output of the mono-stable vibrator M2 appears as a chain of relatively narrow pulses spaced about 64 microseconds apart, as illustrated in FIG. 3.

The counter chain from the clock C2 works as a binary counter and therefore after a certain number of pulses have been received all the "bits" of the counter are in the "1" condition, the counter is said to be in the "−1" state. On receiving one more pulse, all the bits will simultaneously revert to their zero condition and the counter is said to be in a zero or reset state. A further pulse will bring the counter into a "+1" state by setting the least significant bit of the counter into a "1" condition. Thus, it should be appreciated that there are three states of the counter which are relevant to the present apparatus. The first state which is the −1 (or all bits set) state, the second state which is the zero state and the third state which is the +1 state.

Two detector circuits D−1 and D+1 are provided to detect for the presence of the "+1" and "−1" state of the counter. Accordingly, if the outputs of these circuits are fed to an "OR" gate, the output from this gate will appear as the upper plot of FIG. 3, the signal being that at point A in FIG. 2.

Ideally, when the medium through which the signals is being transmitted is not causing any distortion of the signal propagation time and the path length is unchanging, the signals fed to the detectors D−1 and D+1 will be cycling at exactly the same frequency as the output from the 100 ns monostable vibrator in the 15.6 kHz stream. Thus, in that situation the inputs to the "AND" gate will be the upper and lower portions of FIG. 3 (the upper signal being from point "A" and the lower signal being the impulses derived from BPF3). The pulses derived from the 100 nanosecond monostable vibrator fall in the trough between the "reset if slow" (RS) and the "reset if fast" (RF) pulses.

If the signal from the 100 nanosecond monostable vibrator M2 is delayed (this would occur, for example, if the transmitter and receiver transducers were moving apart) then the pulses received are spaced apart greater than 64 microseconds. Thus, referring to FIG. 3, a second pulse occurs at the same time as the "reset if fast" RF pulse. In that event, a reset signal is generated by the "AND" gate and applied to all the counters. This reset signal in this case would reset the counter from a "+1" state to a "zero" state. This effectively retards by one clock pulse the relative time position of the feedback shift register output and accordingly adjusts the replicated pseudo random noise output (RPRN) in FIG. 2 to accommodate the slightly longer path length.

Similarly, if the path length is reduced slightly then a second pulse from the 100 nanosecond monostable vibrator will occur slightly early. In that case, the second pulse will be coincident with the "reset if slow" pulse provided by the "−1" condition detector. This again causes resetting of the counter, but in this case changing the status of the counter from a "−1" state to a "zero" state. Thus, the output from the divide by two divider D5 effectively is provided with an extra clock pulse thereby advancing the sequence of the pseudo random noise by one clock pulse.

In this way then, the duplication of the pseudo random noise is modified to accommodate the variations in signal path length involved.

In accordance with standard signal processing techniques, in order to determine the response of the transmission system including transducers and media, one cross-correlates the replicated pseudo random noise signal (RPRN) with the actual signal received at the receiver. The output of the cross correlation is in fact the system impulse response. If one knows the transfer function of the transmitting transducer as well as the medium through which the signals are propagated, then it is a simple mathematical process to determine the transfer function of the receiving transducer.

Returning to FIG. 2, it should be noted that the output of the 7.8 kHz stream of the receiver is operable to reset the feedback shift register each time the 7.8 kHz signal is detected. The 7.8 kHz signal is passed through a band pass filter BPFS, and amplifier A3, a further band pass filter BPF6, a clipper CL, and a monostable multivibrator M3. The 7.8 kHz synchronising tone is used initially to establish starting points from which the measurements may be taken. Preferably, this synchronising pulse is discontinued once initial synchronisation has occurred.

Figure 4:
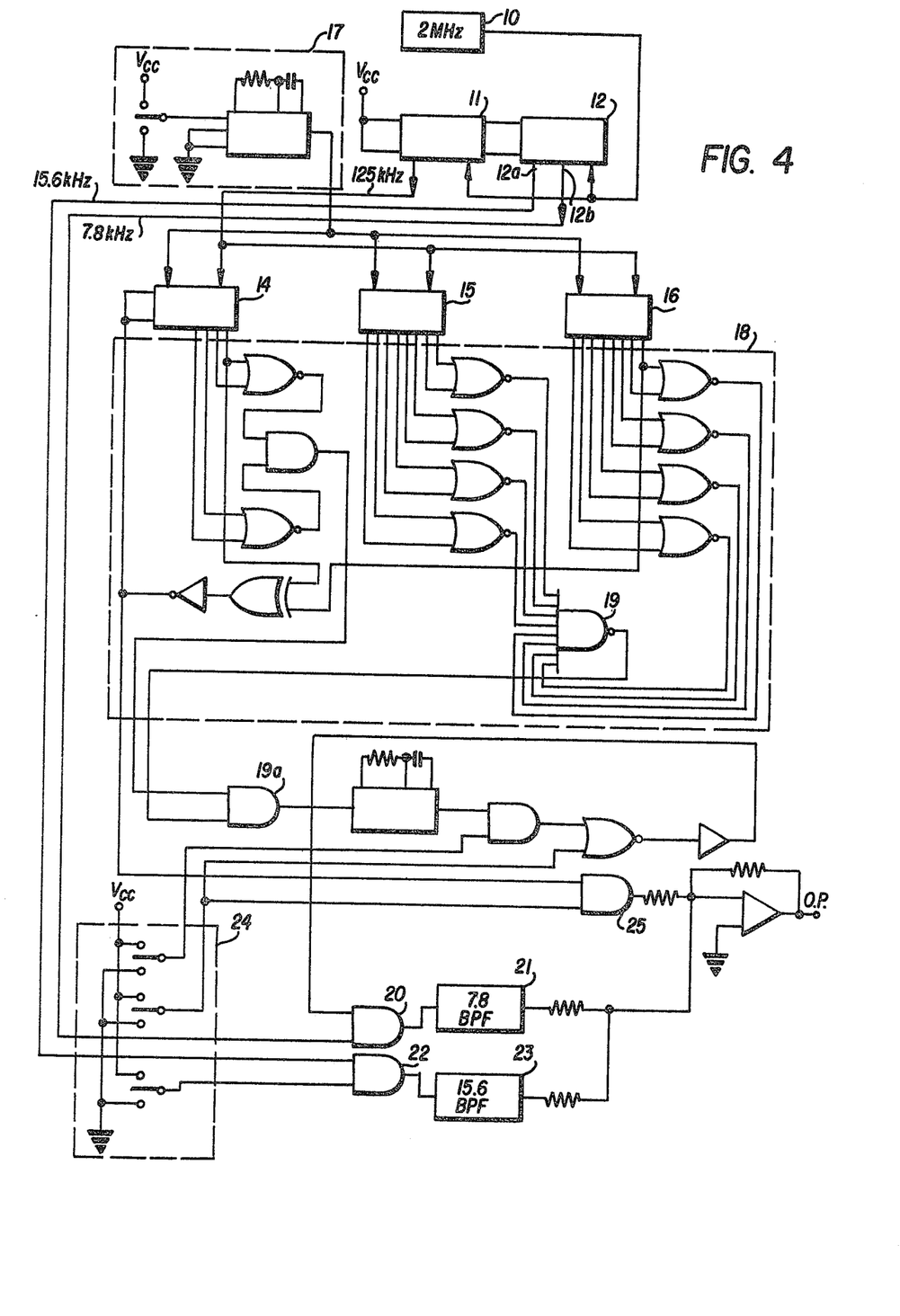
FIG. 4 is a wiring diagram of the transmitter of FIG. 1, and FIG. 5 comprises the wiring diagram for the receiver of FIG. 2.

Turning now to FIG. 4, this figure illustrates in some detail the substance of the transmitter circuit shown in block form in FIG. 1. The 2 MHz clock is shown as item 10 at the top of the drawing. The output of this clock feeds into strobe inputs of counter circuits 11 and 12 which provide the divider chain illustrated in block form in FIG. 1. The output 13 from counter 11 is fed as a shift register clock signal to shift registers 14, 15 and 16. These three circuits are configured in a recirculating sense and preloaded with data such that when recirculating their output will be pseudo random noise. Circuit 17 is provided to enble the manual reset of the shift registers.

In general terms the circuitry within dotted outline 18 corresponds to the sequence start detector block (SSD) of FIG. 1. In effect, this circuitry is designed to provide an indication when a predetermined number sequence appears or is present in the shift register set. When this sequence appears, the appropriate signal is provided at the output of gates 19 and 19a and as a result, the 7.8 kHz signal derived from counter circuit 12 is passed by gate 20 through 7.8 kHz band pass filter 21 and on to the output of the transmitter. Thus, this 7.8 kHz signal is used as a synchronising pulse and it is in fact used to ensure that the shift register used to generate the replicated pseudo random noise in the receiver is reset at the appropriate time to ensure co-ordination of the two signal generation sections.

15.6 kHz and 7.8 kHz signals are provided at terminals 12a and 12b respectively of counter circuit 12 and pass via AND gates 22 and 20, and via 15.6 kHz and 7.8 kHz band pass filters 23 and 21 to the output of the transmitter. Switch circuit 24 is an enabling circuit for each of these signals, as well as the random noise test signal. The signals are applied to the output when the output terminals of the wiper contacts are connected to Vcc contact thereby enabling AND gates 20, 22 and 25.

The output (O.P.) from FIG. 4 is applied to a transducer which generates the test signal.

Figure 5:
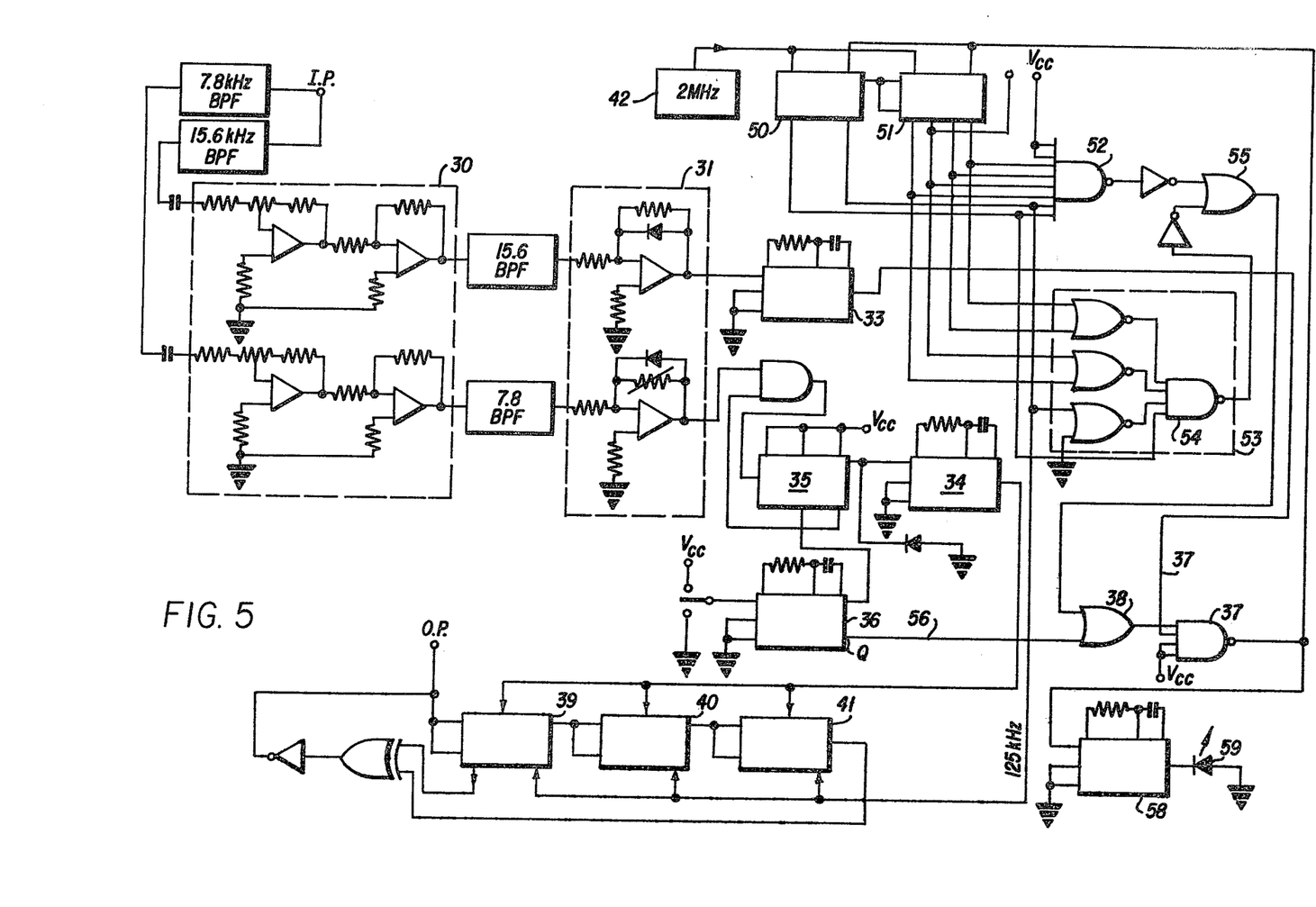

Referring now to FIG. 5, there is shown a circuit having an input (I.P.) to be connected to a receiving transducer and for providing an output (O.P.) being a replicated, compensated pseudo random noise output signal suitable for cross correlation with the detected signal. FIG. 5 shows the input signal applied to two circuit paths respectively operating on 15.6 kHz and 7.8 kHz signals, each of the circuit paths comprising a band pass filter (BPF), amplifiers contained in an amplifier unit 30, further band pass filters, signal clippers contained in unit 31 and respective integrated circuit units 33 and 34 which correspond with the 100 nanosecond monostable vibrator units described in FIG. 2. The output from monostable vibrator 33 is applied to a gate 57 of a second circuit portion described hereinafter and the output of monostable multivibrator 34 is applied to a third circuit portion comprising feedback shift registers 39, 40 and 41.

The second circuit portion is similar to the corresponding portion of FIG. 4 and comprises a 2 MHz clock 42 connected to frequency dividing counter circuits 50, 51. The output of the counter circuits 50 and 51 are applied to a "NAND" gate 52 for the purpose of determining the "−1" condition on the counter and also to a gate circuit 53 arrranged for determining the "+1" condition of the counters. It will be seen tht in order to find a "−1" condition, all six output bits from the counter will have to be in the positive or "1" state in order to operate the "NAND" gate 52. On the other hand in order to secure a "+1" condition from circuitry 53, five of the six outputs from the counter circuit will have to be in the low or "0" state while the least significant digit (the output from Q$_C$ of circuit 50) will have to be in the positive "1" state thereby providing an output from gate 54.

Thus, as counters 50 and 51 are continuously cycled, from time to time a pulse will occur at the output from NAND gates 52 and 54 respectively putting sequential pulses out at the output from OR gate 55.

Input 56 to gate 38 relates to initializing conditions. A signal is derived from output Q of monostable vibrator 36. This signal does not affect the normal running of the device and is only used for the establishment of initial conditions for the system.

Input 37 to gate 57 carries the 15.6 kHz signal which was filtered and processed using the upper stream of the circuit shown in FIG. 5. Thus in gate 57 the series of spikes produced by circuit 33 are gated with the two pulses produced at the output of gate 38, and, when either of these two pulses is coincident with one of the spikes produced at input 37 a positive signal will appear at the output of gate 57, thereby resetting counter circuits 50 and 51 and also firing a monostable vibrator 58 to activate light emitting diode 59.

Thus, it can be seen that the wave form diagram shown in FIG. 3 may be implemented by the circuits shown in FIG. 5, the lower portion of FIG. 3 (in which the 64 micro second pulses are shown) being generated by the upper stream of FIG. 5, while the upper portion of FIG. 3 (including the "reset if slow" and "reset if fast" signals) being generated using the clock, counter and gate circuits. The integration of the upper and lower graphs of FIG. 3 is effected at the "NAND" gate 57, and the counters 50 and 51 are reset if either of the pulses of the upper signal of FIG. 3 overlaps with the pulses of the lower portion of FIG. 3.

The third circuit portion of FIG. 5 receives as input the pulsed output of the monostable multivibrator 34 as a reset signal to each of three feedback shift registers 39, 40 and 41 and a clock signal of 125 kHz from the frequency dividing counter 50. Thus, the shift register of FIG. 5 is arranged to output a pseudo random noise signal which is in correspondence with the pseudo random noise signal transmitted by the transmitter but which is modified to compensate for fluctuations in the transmission time of the signals through the medium, the compensation being effected by advancing or retarding the count on the counter circuits 50 and 51 in accordance with the output from gate 57.

The output from the 7.8 kHz stream constituting an output from monostable multivibrator 34 acts as a resetting means whereby initial synchronisation of the feedback registers of FIG. 5 can occur with respect to the feedback registers of FIG. 4.

As indicated earlier, in order to process the data received by the receiver, the replicated pseudo random noise output is cross correlated with the raw pseudo random noise signal received by the receiver. In order to effect the cross correlation of the two signals, the signals may be stored in a commercially available signal processor instrument such as a Hewlett Packard HP 5420. As noted earlier, when using this machine it is possible to apply a gating window in the time domain to the propagated signal in order to secure the optimum result after cross correlation. Any number of gating windows may be chosen for this purpose after the cross correlation calculations, and since all the data is stored in the machine, analysis in this way is readily achieved. A Fourier transform can finally be applied to the gated cross-correlation function.

A MATHEMATICAL ANALYSIS OF THE CROSS CORRELATION PROCESS USED IN THE PREFERRED EMBODIMENT OF THIS INVENTION

Let the two functions to be cross correlated be i(t) and s(t). The cross correlation of these functions may be expressed as follows:

$$f(\tau) = \int_{-\infty}^{\infty} i(t) s(t - \tau) \tau dt$$

In this case i(t) will be called the measured output of the transducer to be tested, while s(t) is the signal transmitted.

If $s_1(t) = s(-t)$ then $$f(\tau) = \int_{-\infty}^{\infty} i(t) s_1(\tau - t) dt$$

Therefore $f(t) = i(t) * s_1(t)$ $$= s(-t) * i(t)$$

where "*" indicates the convolution of the two signals involved.

Thus $s(t)$ = original signal transmitted $h(t)$ = true hydrophone response $r(t)$ = response of medium If we take a Fourier transform of this equation then $F(\omega) = S(\omega)^* S(\omega) H(\omega) R(\omega)$ where the superscript * notes the conjugate transpose $= |S(\omega)|^2 |H(\omega) R(\omega)$ If $S(\omega)$ is chosen as white noise over the band of interest then $S(\omega)$ is a contant equal to k and therefore $$F(\omega) = k^2 H(\omega) R(\omega)$$

then $f(t) = k^2 h(t) * r(t)$

The measured signal f(t) may be edited to remove the seocndary signal arrivals by multiplying by gating function $\omega(t)$ and then the gated cross correlation function is given by $$e(t) = f(t) w(t) = \{k^2\{r(t) * h(t)\} w(t)$$

$$= k^2 r h(t) w(t)$$

if r(t) is a constant prior to the secondary signal arrival. By carrying out a Fourier transform on this function an estimate of the hydrophone response is measured as $$E(\omega) = \{H(\omega)^* W(\omega)\}/2\pi$$

THE EFFECT OF PROPAGATION TIME FLUCTUATIONS

To achieve the potential gains of the cross-correlation process it is necessary that a true replica of the signal at the input to the receiving hydrophone is available. Because of fluctuations in the acoustic path the signal at the receiving hydrophone may be shifted in time relative to the transmitted signal. Suppose that this time shift has a value $\epsilon$ relative to the mean at some instant. Also suppose that $\epsilon$ has a probability distribution function of $m(\epsilon)$. Then at any time t $$f(t) = s(-t)^* s(t-\epsilon) * h(t) * r(t)$$

The expected value of (t) is given by $$E(f(t)) = \left\{ \int_{-\infty}^{\infty} m(\epsilon)s(t - \epsilon)d\epsilon \right\} *S(-t)*h(t)*r(t) =$$

$$m(t)*s(t)*s(-t)*h(t)*r(t)$$

Then $E(F(\omega)) = M(\omega)|S(\omega)|^2 H(\omega) R(\omega)$ If $\epsilon$ is uniformly distributed so that $$m(t) = 0 \text{ for } |t| > t_o$$
$$= \tfrac{1}{2} t_o \text{ for } |t| < t_o$$

Then $M(\omega) = \sin(\omega t_o)/(\omega t_o)$

The term $M(\omega)$ is generally unknown and hence introduces an error in the estimate of $H(\omega)$. From the last equation, an error in excess of 1 dB will arise if $t_o > 1.1/\omega$ At a frequency of 10 kHz, this last mentioned relationship requires a maximum timing variation of 18 s to maintain the error below 1 dB. Even if the sound velocity is perfectly constant this requires the distance between the transmit and receive hydrophones to vary less than ±2.7 cm, which is often unachievable.

To overcome this limitation, a system has been implemented in which the time variation in the received signal is replicated in the signal with which the hydrophone output is correlated. By doing this the output is given by $$f(t) = S(-(t - \epsilon))^* S(t - \epsilon)^* h(t)^* r(t)$$

or $$F(\omega) = (S(\omega)e^{-j\omega\epsilon})^*(S(\omega)e^{-j\omega\epsilon})H(\omega)R(\omega) = |S(\omega)|^2 H(\omega)R(\omega)$$

In this way the effect of variations in $\epsilon$ are eliminated.

An alternative embodiment of the invention is one in which no synchronising tone is used. Instead, a short term cross correlation is effected on the pseudo random noise signal for the purpose of estimating the delay due to path length variation. This estimate may then be used to compensate for the path length variation over a larger period of time. Typically, psuedo random noise having a band width of 100 kHz is used, and the path length can reasonably be presumed to be constant for the relevant sampling period which for a cross correlation of 1000 points will be about $10^{-2}$ seconds.

This arrangement can offer the advantages of being easier to set up, the transmitter required is simpler and less cumbersome, and there is eliminated what would otherwise be a possible problem of losing the synchronising tone due to fading effects.

I claim:

1. A method of determining the system response for a system where there is noise present and the propagation time of a signal used to test the system response is subject to variation, the method comprising the steps of:
   (a) generating a broad band reproducible test signal and applying it to the system for propagation therethrough;
   (b) detecting the signal after it has been passed by the system;
   (c) producing a replica of the test signal;
   (d) applying compensation to either the detected signal or the replica signal to compensate for fluctuations in propagation time of the test signal through the system, and
   (e) cross correlating the compensated signal with the noncompensated one of the detected and replica signals in order to derive the system response.

2. A method according to claim 1, wherein the compensation is applied to the replica of the test signal.

3. A method according to claim 1, wherein the function produced by cross correlating is recorded and subsequently a Fourier transform is made to analyse the system response.

4. A method according to claim 1 and wherein in addition to said broad band test signal, a secondary signal is generated and detected and the Doppler shift of said secondary signal is utilised for determining the required compensation.

5. A method as defined in claim 4, wherein said secondary signal is a single tone signal.

6. A method as defined in claim 1 wherein the broad band test signal is produced in the form of pseudo random noise by a feedback shift register and said replica of the test signal is produced by a similar feedback shift register, and the method including generating a synchronising pulse to sychronise sequences of said feedback registers.

7. A method as claimed in claim 1 and further comprising recording signals from said cross correalation step and applying a gating window technique to gate-out the signal components due to secondary reflected signals in the system.

8. Apparatus for use in testing the system response of a system in which the propagation time of a broad band test signal applied to the system for this purpose is subject to variation, the apparatus comprising means for receiving the propagated broad band test signal, means to replicate the applied broad band signal, means for determining the required compensation for fluctuations in the propagation time of the test signal through the system, means for compensating the replica signal to compensate for fluctuations in propagation time of the test signal, and output means for providing signals for cross-correlation, the signals being the compensated replicated signal and the broad band test signal.

9. An apparatus as claimed in claim 8 and including means for cross-correlating said output signals thereby providing a cross-correlation function which is capable of analysis by a Fourier transform technique.

10. Apparatus as claimed in claim 8 in combination with means for generating said broad band test signal.

11. An apparatus as claimed in claim 10, wherein said generating means comprises a feedback shift register for generating pseudo random white noise, an identical feedback shift register being provided for said replicating means.

12. An apparatus as claimed in claim 11, and wherein said compensation means comprises means for modifying a clock drive of the feedback shift register to be associated with the receiving portion of the system.

13. An apparatus as claimed in claim 12, wherein said means for modifying includes means for transmitting a second test signal simultaneously with said broad band test signal, and means for detecting second test signal changes in propagation time, the second signal being a single tone signal whereby the propagation time introduces a Doppler shift.

14. An apparatus as claimed in claim 11 and including means for generating a synchronising pulse for the feedback shift registers.

15. An apparatus as claimed in claim 8 in combination with a signal processor arranged for effecting cross correlation of the signals and storing the cross correlation function.

16. Apparatus for use in testing the system response of a system in which the propagation time of a broad band test signal applied to the system for this purpose is subject to variation, the apparatus comprising means for receiving the propagated broad band test signal, means to replicate the applied broad band signal, means for determining the required compensation for fluctuations in the propagation time of the test signal through the system, means for compensating the received broad band test signal to compensate for fluctuations in propagation time of the test signal, and output means for providing signals for cross-correlation, the signals being the replicated signal and compensated received broad band test signal.

17. An apparatus as claimed in claim 16 and including means for cross-correlating said output signals thereby providing a cross-correlation function which is capable of analysis by a Fourier transform technique.

18. Apparatus as claimed in claim 16 in combination with means for generating said broad band test signal.

19. An apparatus as claimed in claim 18, wherein said generating means comprises a feedback shift register for generating pseudo random white noise, an identical feedback shift register being provided for said replicating means.

20. An apparatus as claimed in claim 19, and wherein said compensation means comprises means for modifying a clock drive of the feedback shift register to be associated with the receiving portion of the system.

21. An apparatus as claimed in claim 20, wherein said means for modifying includes means for transmitting a second test signal simultaneously with said broad band test signal, and means for detecting second test signal changes in propagation time, the second signal being a single tone signal whereby the propagation time introduces a Doppler shift.

22. An apparatus as claimed in claim 19 and including means for generating a synchronising pulse for the feedback shift registers.

23. An apparatus as claimed in claim 16 in combination with a signal processor arranged for effecting cross correlation of the signals and storing the cross correlation function.

* * * * *